United States Patent [19]

Stockton

[11] Patent Number: 5,511,299
[45] Date of Patent: Apr. 30, 1996

[54] GEAR BOX VALVE HOUSING REPAIR

[75] Inventor: Elmer A. Stockton, Dallas, Tex.

[73] Assignee: UNC Artex, Inc., Addison, Tex.

[21] Appl. No.: 325,802

[22] Filed: Oct. 19, 1994

[51] Int. Cl.⁶ .................................................. B23P 6/00
[52] U.S. Cl. ................................. 29/402.11; 29/402.17; 29/402.19
[58] Field of Search ........................... 29/402.01, 402.02, 29/402.06, 402.09, 402.11, 402.17, 402.19, 888.011, 890.121

[56] References Cited

U.S. PATENT DOCUMENTS

| | | | |
|---|---|---|---|
| 3,351,043 | 11/1967 | Morrison | 29/402.11 |
| 3,750,259 | 8/1973 | Timmons | 29/402.11 |
| 4,153,983 | 5/1979 | Stockton | 29/402.17 |
| 4,229,867 | 10/1980 | Spencer | 29/888.011 |
| 4,677,723 | 7/1987 | Greene, Sr. | 29/888.011 |

Primary Examiner—David P. Bryant
Attorney, Agent, or Firm—L. Dan Tucker

[57] ABSTRACT

In many complicated castings, such as those utilized to define a gear box for an aircraft jet engine, valve housings or mounting recesses may be integrally formed in the casting. Such housings incorporate a plurality of sealing surfaces which cooperate with a valve mounted therein. The repair of such sealing surfaces when worn is accomplished by machining out all bearing surfaces to a substantially larger diameter, then inserting a sleeve element which fits snugly in the newly machined bore and defines a plurality of sealing surfaces dimensionally identical with the original sealing surfaces formed in the housing.

4 Claims, 2 Drawing Sheets 5,511,299

GEAR BOX VALVE HOUSING REPAIR

TECHNICAL FIELD OF THE INVENTION

The invention relates to the repair of an integral valve housing incorporated in a complex casting, such as that employed in gear boxes for aircraft jet engines.

BACKGROUND OF THE INVENTION

In many industries where complex machinery is employed, it is common to form housings for enclosing a multitude of components, such as a gear box housing, in two parts which are originally formed as steel castings and then are machined to provide the desired internal configuration and a peripheral planar mating surface on each component which are traversed by peripherally spaced bolt holes to receive bolts which effect the sealed securement of the two housing parts.

This technique is employed to manufacture gear box housings for aircraft jet engines with the exception that the castings are formed from a magnesium or aluminum alloy or other suitable material due to the necessity of minimizing the weight of the gear box housing. The shafts and gears mounted in such housing are normally lubricated by a continuous flow of pressurized lubricating oil. The slightest leakage anywhere in the hydraulic system creates the risk of bearing failures. More importantly, the gear box housing and the hydraulic system must maintain its sealed relationship through a wide range of temperatures. Temperatures of minus 50° F. are often encountered by jet aircraft flying at altitudes on the order of 30,000 feet. On the other hand, when the aircraft is on the ground and the ground temperature is 100° F., the temperature of the housing and its contained components may reach the level of 400° F. These extreme reversals of temperature, which occur every time the jet aircraft takes off or lands, impose substantial stresses on the gear box housing and cause wear on all components contained therein. Additionally, these stresses are amplified by stresses derived from the gear shafts which are mounted in beatings supported by machined bores within the gear box housing.

From the foregoing, it will be apparent that gear box housings for jet aircraft have a limited life, yet those housings are individually very expensive to manufacture due to their complexity. The total cost of a single front or rear housing is on the order of $20,000. There is a need, therefore, for a repair technique to restore any defective or worn valve housing to its original machined condition without in any manner decreasing the strength or serviceability of the valve housing and accomplishing such repair for a figure on the order of $5,000 or less to provide a substantial economic incentive for repairing such complex metallic components rather than throwing them away.

SUMMARY OF THE INVENTION

This invention relates to a method for effecting the economic repair of any valve housing bore formed in a complex metallic component, such as a gear box housing for a jet aircraft engine. Wear of such valve housing bores will inevitably occur and will result in leakage in the hydraulic system, thus necessitating the replacement of the entire gear box housing with the result that an expensive component costing on the order of $20,000 is rendered unfit for use due to a relatively minor degree of wear.

In accordance with this invention, repair of such worn valve housing bores may be conveniently and economically accomplished. In the first step, the worn valve housing bore is machined to a substantially larger dimension. In the event that the location of a particular valve housing bore would result in an unusually thin wall due to the enlargement of such bore, additional material is applied by welding to the exterior of the valve housing prior to the machining operation, thereby preserving the strength of that portion of the gear box housing. The outer end of the enlarged bore is then provided with internal threads. The invention also includes machining the cylindrical cavity or bore in a housing to substantially enlarge the diameter thereof and to form internal threads in at least one end of the enlarged cylindrical cavity.

A sleeve element which is snugly insertable in the newly machined bore is then fabricated, said sleeve element being provided with external threads to cooperate with the internal threads formed in the housing bore. Additionally, the sleeve element is provided with annular recesses at a plurality of axially spaced locations for accommodating O-rings to make required seals with the newly machined bore surface in the valve housing. The interior configuration of the sleeve element is identical in dimensions to that of the originally formed bore of the valve housing. Thus, it is assured that the valve may be inserted within the sleeve element and will function in the sleeve element without leakage.

In many valve housings, one or more radial ports are provided passing through the wall of the valve housing and communicating with the interior thereof, generally communicating with portions of the inserted valve. In the event that such radial ports exist, a corresponding port is provided in the sleeve element and O-rings are provided on the exterior of the sleeve element in straddling relationship to the radial port. Thus, pressurized fluid may be passed to the valve through the radial port in the valve housing without incurring any leakage.

Further advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENT

Figure 1:
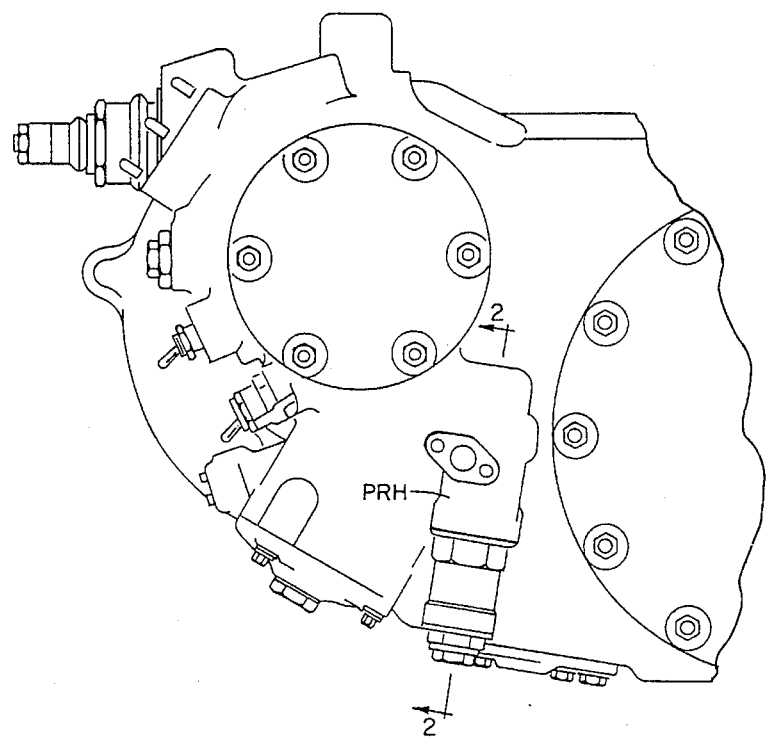
FIG. 1 is a partial elevational view of a gear box for a jet aircraft engine, showing the location of an integral housing for a pressure relief valve.

Referring to FIG. 1, there is shown a portion of a complex gear box housing containing one or more integral valve housings. The particular gear box housing shown is that utilized in the well known JT8D jet aircraft engine manufactured by Pratt & Whitney Aircraft Corporation. Integrally incorporated on such complex housing is a pressure relief valve housing indicated by the letters PRH.

Figure 2:
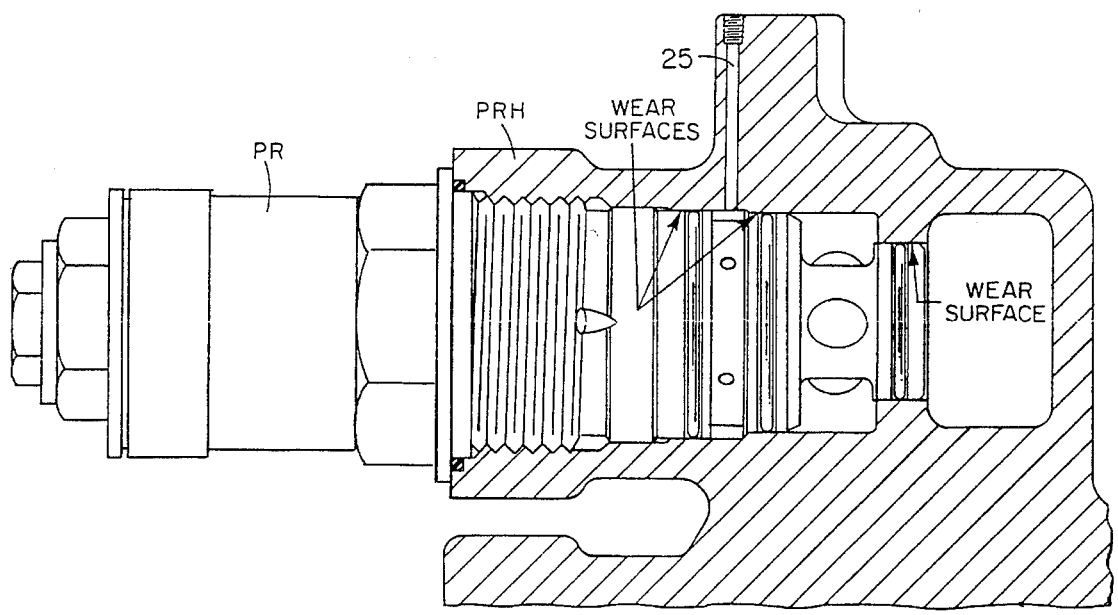
FIG. 2 comprises a partial sectional view taken on the plane 2—2 of FIG. 1 with a valve inserted within the housing.

Referring to FIG. 2, the housing PRH is shown in section together with an inserted pressure relive valve PR. The details of such valve are well known in the art and form no part of this invention, hence will not be further described. Such valve has O-rings which bear against internal cylindrical surfaces machined into the housing which are labelled wear surfaces. These surfaces wear during the use of the jet engine and eventually permit leakage which destroys the integrity of the hydraulic system. This would normally require that the entire complex and expensive gear box housing be scrapped.

Figure 3:
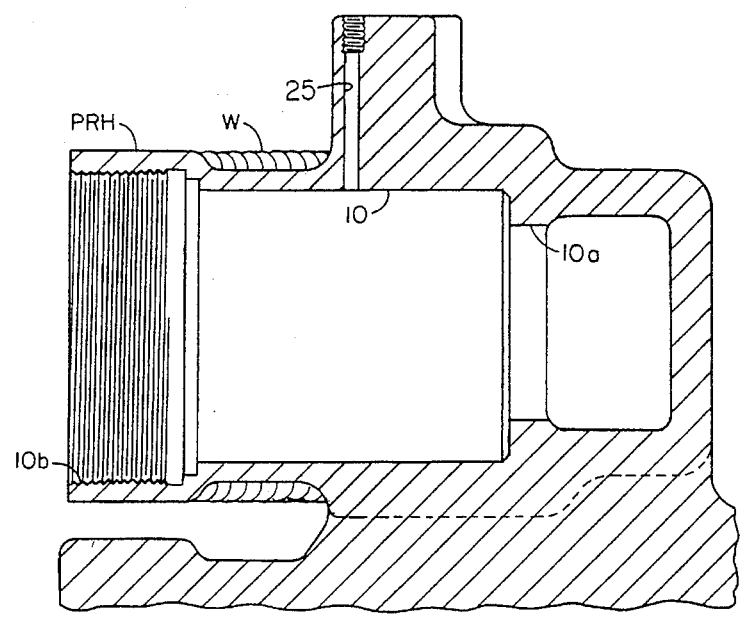
FIG. 3 is an enlarged scale sectional view illustrating the first machining step accomplished to effect the repair of worn sealing surfaces in the valve housing of FIG. 2.

In accordance with this invention, repair of such worn surfaces is accomplished by first machining an enlarged bore through the PRH housing with such bore conforming generally to the configuration of the original bore, as shown in FIG. 3 by bore 10. It will be noted that bore 10 has a reduced diameter portion 10a at its inner end and has internal threads 10b formed in its outer end.

In the event that bore 10 passes through wall sections of the main housing which become too thin as a result of the enlargement of the bore, welding is applied around the exterior of the PRH housing as indicated by W in FIG. 3 to provide an increased wall thickness adequate to compensate for the reduction in wall thickness produced by the bore enlarging machining operation.

Figure 4:
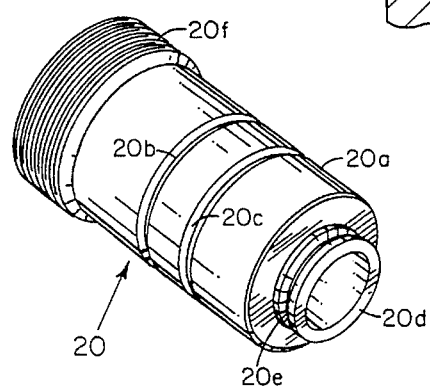
FIG. 4 is a perspective view of a sleeve dement which is to be inserted in the newly machined valve housing.

A tubular element 20, best shown in FIG. 4, is then prepared. Such tubular element has a medial cylindrical portion 20a on which two axially spaced O-ring grooves 20b and 20c are provided. The one end of the tubular element 20 is of reduced diameter as indicated at 20d and this portion is provided with an O-ring groove 20e. The other end of the sleeve element 20 is provided with external threads 20f.

Figure 5:
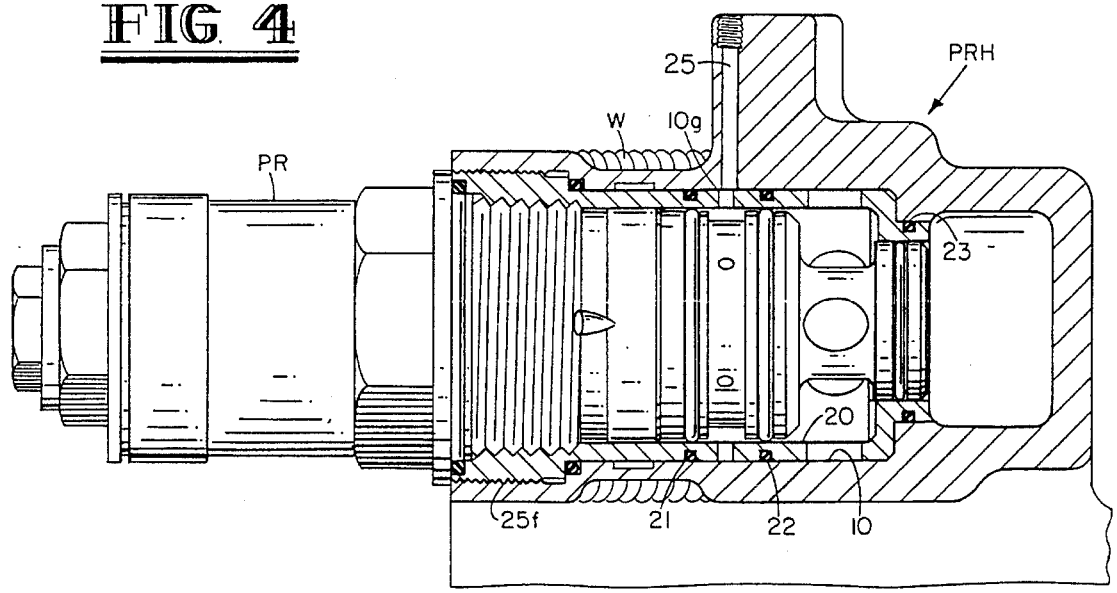
FIG. 5 is an enlarged scale sectional view taken on the plane 2—2 of FIG. 1 but showing the sleeve element in inserted relationship in the valve housing, and a valve inserted in the sleeve dement.

An important feature about sleeve element 20 is that its internal contour is dimensionally identical to the originally machined internal contour of housing PRH so that when sleeve element 20 is inserted in the newly machined bore 10 as shown in FIG. 5, the internal bore dimensions of housing PRH are restored to their original condition.

It often happens that a radially extending fluid passage, such as oil passage 25, is provided in the PRH housing. If such is the case, O-rings 21 and 22 mounted in O-ring grooves 20b and 20c, respectively, straddle such port or ports and, additionally, one or more radial ports 10g are provided in the sleeve element 20 to provide fluid communication from the port 25 into the interior of new bore 10 of housing PRH. O-ring groove 20e accommodates O-ring 23 which engages the reduced diameter bore section 10a defined in the enlarged bore 10 of housing PRH.

From the foregoing description, it will be readily apparent to those skilled in the art that this invention permits the economic repair of a valve housing portion of a complex mechanical component, such as a gear box housing for a jet aircraft engine, at a cost very much less than the cost of replacing the entire gear box housing. Furthermore, the replacement operation does not in any manner decrease the strength of the gear box housing nor reduce the sealing integrity of the valves which cooperate with the internal bore of the repaired housing.

Although the invention has been described as it might be used to repair a cylindrical housing for a pressure relief valve on a gear box housing for an aircraft engine, it is to be understood that the method of the present invention is not limited to this application, and that the invention is equally applicable to the repair of housings for other components, and to other types of metallic housings than gear box housings for aircraft engines.

Although the invention has been described in terms of a specific embodiment which is set forth in detail, it should be understood that this is by illustration only and that the invention is not necessarily limited thereto, since alternative embodiments and repair techniques will become apparent to those skilled in the art in view of the disclosure. Accordingly, modifications are contemplated which can be made without departing from the spirit of the described invention.

What is claimed and desired to be secured by Letters Patent is:

1. A method of repairing a cylindrical cavity in a housing, said cavity having an original bore with a worn internal cylindrical sealing surface and a radial fluid port opening into said cylindrical sealing surface, comprising the steps of:

machining said cavity to substantially enlarge the diameter thereof and to form internal threads in at least one end of the enlarged cylindrical cavity;

forming a sleeve having an external surface snugly insertable in said enlarged cylindrical cavity and having external threads engagable with said internal threads, said sleeve having an internal bore dimensionally conforming to the diameter of the original bore of said cylindrical cavity;

forming a pair of O-ring grooves around the circumference of said sleeve;

mounting an O-ring seal in each O-ring groove of said sleeve;

forming a radial bore in said sleeve intermediate said O-ring seals, the radial bore extending from the exterior of the sleeve to the internal bore of the sleeve;

inserting said sleeve in said cylindrical cavity and threadably engaging said internal and external threads to secure said sleeve in said cylindrical cavity with said O-ring seals straddling said radial port, thereby providing fluid communication between said radial port and the internal bore of said sleeve, and duplicating the original configuration of said cylindrical cavity.

2. The method of claim 1, further comprising the step of adding metal by welding to exterior portions of said housing prior to said machining to preserve the strength of said housing following said machining.

3. The method of claim 1, wherein said cylindrical cavity includes an inner smaller diameter sealing surface adjacent to said worn internal cylindrical sealing surface, further comprising the steps of:

machining the smaller diameter sealing surface to substantially enlarge the diameter thereof; and forming a cylindrical extension on said sleeve sealably cooperable with said enlarged smaller diameter sealing surface and having an internal bore dimensionally identical to the diameter of the original smaller diameter sealing surface.

4. A method of repairing a cylindrical cavity in a housing, said cavity having an original bore with a worn internal cylindrical sealing surface and a radial fluid port opening into said cylindrical sealing surface, comprising the steps of:

machining said cavity to substantially enlarge the diameter thereof and to form internal threads in an outer end of the enlarged cylindrical cavity;

forming a sleeve having an external surface snugly insertable in said enlarged cylindrical cavity and having external threads engagable with said internal threads, said sleeve having an internal bore dimensionally conforming to the diameter of the original bore of said cylindrical cavity;

forming a pair of O-ring grooves around the circumference of said sleeve;

mounting an O-ring seal in each O-ring groove of said sleeve;

forming a radial bore in said sleeve intermediate said O-ring seals, the radial bore extending from the exterior of the sleeve to the internal bore of the sleeve;

inserting said sleeve in said cylindrical cavity and threadably engaging said internal and external threads to secure said sleeve in said cylindrical cavity with said O-ring seals straddling said radial port, thereby providing fluid communication between said radial port and the internal bore of said sleeve, and duplicating the original configuration of said cylindrical cavity.

* * * * *